SIMULTANEOUS MESSAGE FRAMING AND ERROR DETECTION

Filed Nov. 29, 1963

2 Sheets-Sheet 1

INVENTOR
ALEXANDER H. FREY, JR.

BY Owen Lamb

AGENT

United States Patent Office 3,336,467
Patented Aug. 15, 1967

3,336,467
SIMULTANEOUS MESSAGE FRAMING AND ERROR DETECTION

Alexander H. Frey, Jr., Gaithersburg, Md., assignor to International Business Machines Corporation, New York, N.Y., a corporation of New York Filed Nov. 29, 1963, Ser. No. 326,879
12 Claims. (Cl. 235—153)

The invention relates to data transmisison systems and is more particularly concerned with the insertion of framing information into transmitted code groups.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In digital computers and in data transmission systems, binary code sequences are frequently employed. These binary code sequences take the form of trains of positive and negative electrical pulses representing zero and one data bits. In data transmission systems which are subjected to noise, suitable error correcting codes have been developed to provide a means for detecting and correcting these errors. The widest and most variable class of codes in present use are called polynomial codes which are implemented by using the basic properties of division for polynomials.

In prior devices utilizing polynomial codes, data bit sequences are encoded by dividing the data bits by a coding polynomial P(X) thus obtaining a remainder R(X). The remainder bits comprise the error checking bits and are transmitted following the data bits, the total comprising a message group M(X), $n$ bits in length. This message is usually preceded by a series of framing bits which mark the beginning of the message. At the receiver a framing signal obtained from the framing bits is required to clear the decoding circuits and to sense the beginning of a message. The decoder then proceeds to divide the message by P(X). The remainder result of this division will be zero if no errors occurred during the transmission.

The separate framing signal is necessary in the prior art apparatus in order to assure that the decoder circuits are clear of errors caused by spurious noise which exists on the data channel. Existing methods of message framing are costly in terms of wasted message space because a considerably large number of bit positions must be allocated to insure reliable framing.

It is a paramount object of this invention to provide a more practical and simplified system for the insertion of framing information in transmitted code groups.

It is a further object of this invention to provide apparatus for framing separate message groups which does not require framing bits in addition to error checking bits.

It is also an object of this invention to provide improved apparatus for framing message groups which will separate any predetermined message sequence from other message sequences and which will not be hampered by intervening noise.

The above and related objects are accomplished in accordance with one aspect of the invention by providing a shift register decoder for obtaining the remainder of the division of successively received appropriately encoded message groups $n$ bits long by a coding polynomial P(X). An $n$-bit buffer is provided to store the most recently received $n$ bits. Means are provided for continually updating the contents of the shift register by subtracting from the register the effect a bit received $n$ bit-times earlier had on the contents of the shift register, each time a new data bit is received at the input of the shift register. Thus the shift register always contains the remainder obtained by dividing the contents of the $n$-bit buffer by the coding polynomial P(X). Whenever the last preceding $n$ bits received correspond to a message sequence, the remainder modulo P(X) is zero or some preassigned pattern. Comparing means are provided for continuously testing the contents of the shift register for the preassigned test pattern of ones and zeros or all zeros. When the pattern appears the contents of the buffer are gated to the output of the decoder.

In accordance with another aspect of the invention, means are provided in an encoder for altering the remainder in such a manner prior to transmission that the remainder of the division of a message sequence obtained in the decoder is equal to some preassigned test pattern, rather than all zeros.

The invention has the advantage that no extra framing bits are necessary to mark the beginning and/or end of a message. The invention utilizes the already present redundancy bits used for error detection thus eliminating the need for separate framing bits.

The invention has the further adavntage that if synchronization with the incoming messages is ever lost because of an error condition, synchronization on the next received error free message will automatically occur since the compare circuits will recognize the existence of the prescribed test pattern.

A further advantage of the invention is that separate test patterns may be assigned to different transmitters which may all transmit messages simultaneously. Messages associated with only one of the plurality of transmitters may be segregated by a decoder by merely selecting the test pattern used by that transmitter.

The foregoing and other objects, features and advantages of the invention will be apparent from the following and more particular description of a preferred embodiment of the invention, as illustrated in the accompanying drawings.

Figure 1:
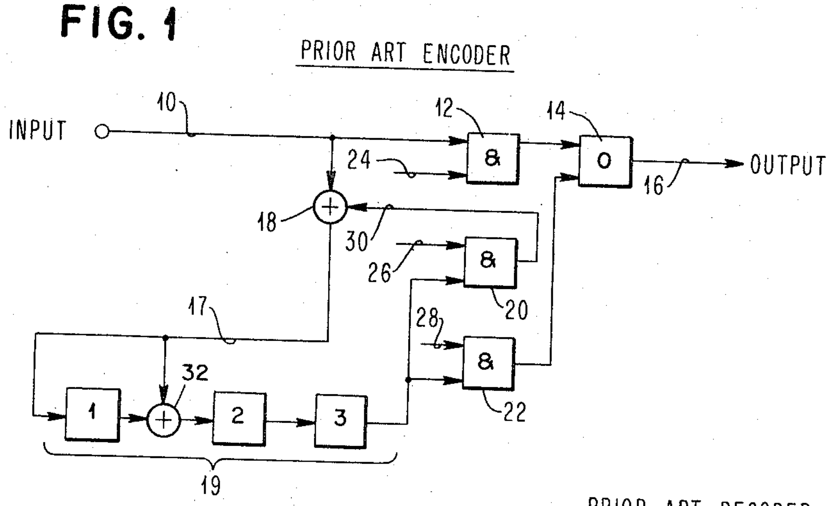
FIGURE 1 is a block schematic diagram of a prior art encoder.

In order to more fully understand the present invention, a brief review of polynomial coding techniques will precede the detailed description of the invention.

A series of data bits, binary zeros and ones, may be represented as a polynomial having $x$'s raised to descending powers with coefficients of 0 or 1 depending upon the digits of the data bits.

A sequence of $k$ digits $a_{k-1}, a_{k-2}, \ldots a_1, a_0$ may then be represented by a polynominal D(X):

(1) $$D(X)=a_{k-1}X^{k-1}+a_{k-2}X^{k-2}+ \ldots +a_1X+a_0$$

P(X) represents a second sequence of bits of a suitably chosen coding polynominal. The degree of P(X) is denoted by $r$.

The first step in the coding scheme of the prior art is to multiply D(X) by X raised to the power $r$:

(2) $$X^rD(X)$$

*Example 1*

Bit sequence 10011 is equivalent to the polynominal $D(X)=1X^4+0X^3+0X^2+1X+1$, arranging higher order coefficients from left to right, in the bit sequence. If $r=3$, then $$X^rD(X)=1X^7+0X^6+0X^5+1X^4+1X^3+0X^2+0X+0$$

Written in binary form this becomes 10011000, which is equivalent to shifting the original bit sequence three places to the left.

The next step is to divide X^rD(X) by the coding polynominal P(X). Addition and subtraction are carried out modulo 2, which is represented by the symbol ⊕. The result of this division is a quotient Q(X) and a remainder R(X), the degree of R(X) being less than *r*, the degree of the coding polynominal.

$$\frac{X^rD(X)}{P(X)}=Q(X)\oplus\frac{R(X)}{P(X)} \tag{3}$$

which is equivalent to:

$$X^rD(X)=P(X)Q(X)\oplus R(X) \tag{4}$$

Let M(X) represent the transmitted message polynomial which includes the original data plus the error checking bits, R(X):

$$M(X)=X^rD(X)\oplus R(X)=P(X)Q(X)$$

(Note that addition and subtraction modulo 2 give the same result.)

The coefficients M of M(X) are the bits transmitted over the channel, which are actually the data bits followed by the remainder bits.

*Example 2*

In Example 1 let $P(X)=1X^3+0X^2+1X+1$. Then the division of X³D(X) by P(X) will be as shown below:

$$\begin{array}{r|l} & X^4+X^2 \\ \hline X^3+X+1 & 1X^7+0X^6+0X^5+1X^4+1X^3+0X^2+0X+0 \\ & 1X^7 \quad +1X^5+1X^4 \\ \hline & \quad 1X^5 \quad +1X^3 \\ & \quad 1X^5 \quad +1X^3+1X^2 \\ \hline & \qquad\qquad 1X^2+0X+0 \end{array}$$

The remainder of this division is: $1X^2+0X+0$ or 100 in binary form.

Since X³D(X) is equivalent to 10011000, then $$X^3D(X)+R(X)$$

is equivalent to $10011000\oplus100=10011100=M$.

The sequence of bits represented by M is transmitted, higher order bits first, to a receiver and the received bits are represented by M′. If transmitted without error, M′ equals M. At the receiver assuming $M=M'$, M(X), the polynomial having coefficients corresponding to M, is divided by P(X). Since no errors have occurred during transmission the remainder of this division will be equal to zero. This is proven by considering the result of dividing M(X) by P(X):

$$\frac{M(X)}{P(X)}=\frac{X^rD(X)}{P(X)}\oplus\frac{R(X)}{P(X)}$$

From Equation 3

$$\frac{X^rD(X)}{P(X)}=Q(X)\oplus\frac{R(X)}{P(X)}$$

therefore:

$$\frac{M(X)}{P(X)}=Q(X)\oplus\frac{R(X)}{P(X)}\oplus\frac{R(X)}{P(X)}=Q(X)+0$$

Hence the remainder of this division is equal to zero. If, however, an error occurred in the message the division will yield a remainder which is unequal to zero, indicating that an error occurred.

The apparatus used to implement the prior art code is shown in FIG. 1. The coding polynomial used in this example is $1X^3+1X+1$. For simplicity, many of the details concerning clocking information, shift lines, etc. have been omitted from the drawing. This conforms to accepted practice in the art. See for example W. W. Peterson, "Error Correcting Codes," Wiley 1961. The input line 10 is connected to an AND circuit 12 which is connected to an OR circuit 14 which is connected directly to an output line 16. The input line 10 is also connected to one of the inputs of modulo 2 adder 18. The output 17 of modulo 2 adder 18 provides inputs to a shift register 19 the stages of which are identified by the numerals 1 through 3. The lower numbers correspond to the lower order stages of the shift register, and shifting is accomplished from left to right. The output of the last stage 3 of the shift register is fed to AND circuits 20 and 22. The output of the AND circuit 20 feeds the other input of modulo 2 adder 18. The output of AND circuit 22 feeds a second input to OR circuit 14. Since the last stage of shift register 19 is fed back via adder 18 to be added to other stages of the shift register, this arrangement is commonly called a "linear feed-back shift register."

During encoding of message bits, in the prior art apparatus, the shift register is first cleared of all information by a clocking pulse (unshown). Initially AND circuit 12 is energized by a timing signal which opens the gate input 24 to allow the data input on line 10 to pass directly through the AND circuit 12 through the OR circuit 14 to the output line 16. AND circuit 20 is initially energized by gate line 26, while AND circuit 22 is initially de-energized by gate line 28. Thus, the output of the last stage 3 of the shift register is fed back through AND circuit 20 via line 30 to the modulo 2 adder 18, where it is added, modulo 2, to the data input line. Thus, the data input appears three shifts ahead of stage 1 of the shift register which is equivalent to a multiplication of the input by X³. The feedback lines 17 insert feedback information into the shift register to complement such shifted positions as correspond to the coding polynomial. For example, modulo 2 adder 32 complements the output of position 1 corresponding to X of P(X). This accomplishes a division of the data input by the coding polynomial whereby only the remainder remains in the shift register after all data bits have arrived at the input 10.

After all the information bits have been received, a timing pulse de-energizes lines 24 and 26 to thereby block data from passing to the output line and to also block the feedback from the shift register output stage 3. At the same time line 28 is energized to thereby permit the contents of the shift register to be shifted out through the AND gate 22 and OR circuit 14 to the output line. Thus, following the message, the remainder of the division of the message by the coding polynomial is shifted out and added to the end of the message.

The following table illustrates the contents of the shift register during the encoding of data bit sequence 10011.

| Input | Shift Register | | |
|---|---|---|---|
| | 1 | 2 | 3 |
| Reset | 0 | 0 | 0 |
| 1 | 1 | 1 | 0 |
| 0 | 0 | 1 | 1 |
| 0 | 1 | 1 | 1 |
| 1 | 0 | 1 | 1 |
| 1 | 0 | 0 | 1 |

The remainder is $1X^2+0X+0$. Added to the end of the data bits, the transmitted message is 10011100. The higher power digits are transmitted first.

Figures 2, 3:
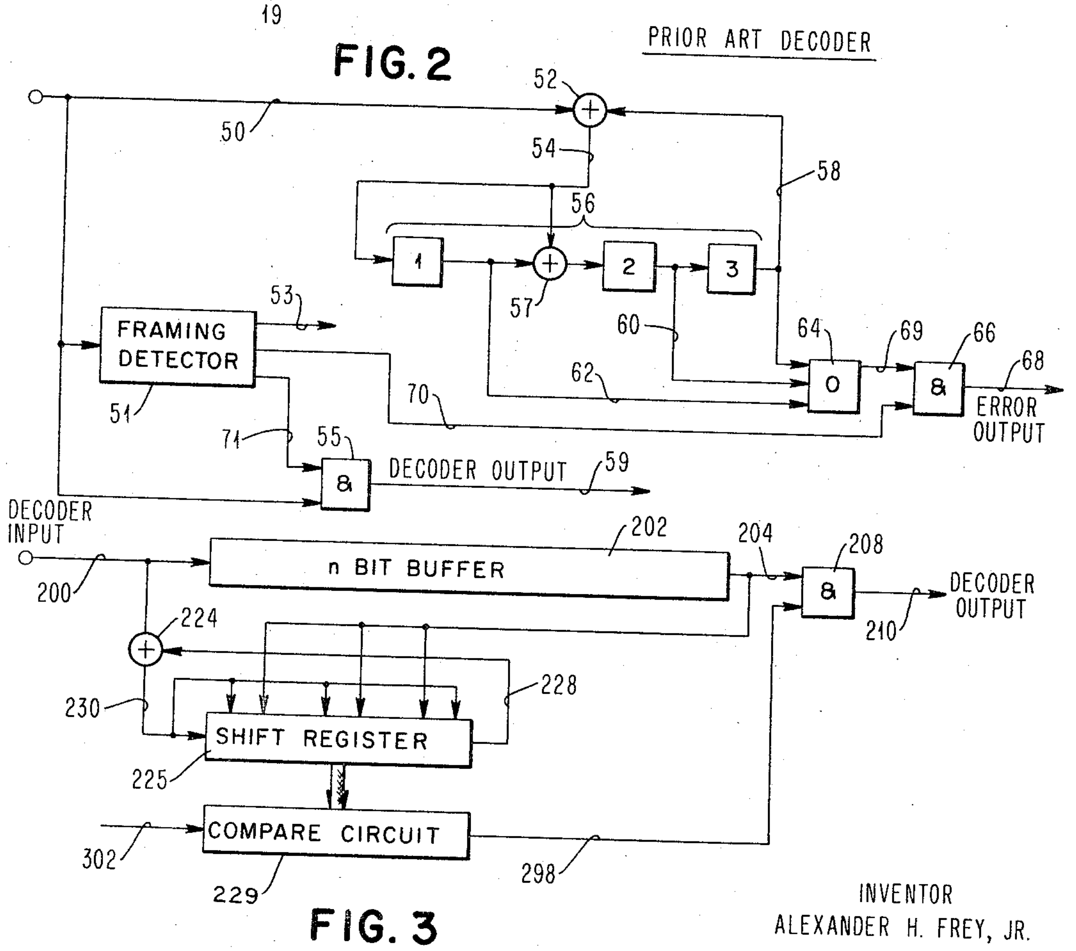
FIGURE 2 is a block schematic diagram of a prior art decoder.
FIGURE 3 is a block schematic diagram of a decoder in which the invention is embodied.

The prior art decoder shown in FIG. 2 is similar to the prior art encoder in FIG. 1, except that the AND gates 12, 20, 22 and OR circuit 14 of FIG. 1 are unnecessary. In the decoder, an input line 50 is fed to one input of a modulo 2 adder 52. The output 54 of the modulo 2 adder is fed to the first stage 1 of a shift register 56 and is fed to modulo 2 adder 57, which complements the shifted output of shift register position 1, in accordance with the coding polynomial chosen, which, in this example is $X^3+X+1$. The output 58 of stage 3 of the shift register is fed back to the modulo 2 adder 52. The outputs of all of the shift register positions 58, 60 and 62 are fed to an OR circuit 64 the output of which is fed to an AND circuit 66. Another leg 70 of the AND circuit provides an error sample line. The output 68 of the AND circuit supplies an error output indication.

The operation of the prior art decoder is similar to the operation of the prior art encoder. The data bits plus the remainder bits, which comprise the message bits transmitted, are received at the input line 50. The message bits are usually preceded by a series of framing bits. A framing detector 51 is provided for detecting the framing bits and for generating a framing signal 53 which clears the shift register of all previous information. The detection circuit 51 also generates a signal 71 which gates the message bits via AND 55 to decoder output 59. The input 50 is added modulo 2 to the output 58 of the shift register 56. The output of the modulo 2 adder 52 is fed back to selected positions of the shift register in a pattern which represents the coding polynomial. Thus, division of the input signal by the coding polynomial is accomplished in the shift register. The outputs of the shift register positions are fed to an OR circuit. If the message has been received without error, all of the positions will contain zeros and therefore the OR circuit 64 will not have a signal on its output. The end of the received message is also usually indicated by a series of framing bits. The detection circuit 51 detects the end of message and initiates an error sample on line 70 which samples the AND circuit 66. If there has been no error, leg 69 of AND circuit 66 will be de-energized and hence there will be no error output on the error output line 68. However, when a message has picked up an error, one or more of the shift register positions will contain a one bit. This will energize the output 69 of OR circuit 64 thus allowing the error sample pulse on line 70 to pass through the AND circuit 66 giving an indication of the error on output line 68.

In the prior art example just described, separate framing bits are necessary at the beginning of the message, to reset the shift register to zero before division by the coding polynomial. Framing bits are also necessary at the end of the message to indicate that the entire message has been decoded, so that an error sample pulse may be generated to test the contents of the shift register for all zeros.

The invention will now be described broadly with reference to FIG. 3 which is an overall block diagram of a decoder in which the invention is embodied. The input 200 is fed to an $n$ bit buffer 202 which receives bits at its input and includes means for shifting the bits to its output 204. The capacity of the buffer is $n$ bits where $n$ equals the number of bits in an encoded message and it takes $n$ bit periods for a bit to be shifted the full length of the register. The buffer may be a shift register, delay line, core memory, magnetic tape or other suitable storage medium.

The input 200 is also fed to a linear feed-back shift register 225 similar to that shown in FIG. 2. The input 200 and the output 228 of the shift register are added modulo-2 by modulo-2 adder 224 and the modulo-2 sum 230 is fed to certain positions of the shift register. Compare circuit 229 is fed by outputs from each shift register stage and a data synchronizing line 302. The output 298 of the compare circuit controls the gating of $n$ bit buffer output 204 to decoder output 210 via AND circuit 208.

The circuit operates as follows. Data bits are received at input 200. It will be recalled that in the prior art decoder (FIG. 2) a special framing signal was required at the start of each message in order to provide a means for resetting the shift register. The framing signal was usually obtained by detecting a series of framing bits. This signal and therefore the framing bits are not necessary in the decoder constructed in accordance with the invention. Bits are stored in buffer 202 and are simultaneously presented to modulo-2 adder 224 to be added modulo-2 to the output 228 of the shift register and fed back to certain stages of the shift register by a line 230, to thereby perform a division by P(X) in a manner similar to that of the prior art described with reference to FIG. 2. As each new bit is received, the data sync line 302 samples compare circuit 229 to see if the contents of the shift register are zero. After a full $n$ bit sequence has been received, if the sequence is a valid error-free message, an output will occur on line 298 for the next $n-r$ bit times. This indicates that the last $n$ bits stored in the buffer comprise a valid message sequence (data plus error check bits) and will gate the $n-r$ data bits to the decoder output line 210. If, however, the series of $n$ bits do not comprise a message sequence, then as each new bit is received, the effect that a bit received $n$ bits earlier had on the contents of the shift register is subtracted from the contents of the shift register by the feedback lines supplied by the $n$ bit buffer output line 204. The feedback lines are selected to complement such shift register stages as will maintain in the shift register the congruence with respect to P(X) of the bit sequence stored in the buffer. The output of the $n$ bit buffer always represents a bit which has been received $n$ bit periods earlier. Thus, the shift register always contains the remainder value of the division by P(X) of the last preceding $n$ bits stored in the buffer 202. This process continues, i.e. each time a bit is received at the input of the shift register, the effect that a bit received $n$ bit periods earlier had on the shift register is subtracted out, until an output from the compare circuit 229 indicates that a zero remainder (or a predetermined test pattern as explained subsequently) has occurred. Hereafter, the symbol $X^n$ will be used to identify the polynomial function which must be subtracted from the shift register.

In the prior art the practice has been to provide a test pattern consisting of all zeros, corresponding to a remainder value of zero. It is desirable to be able to search for a remainder value other than zero, because the shift register may contain all zeros at times other than when a valid message sequence has been received, as for example when no message at all has been received. To obviate this situation, means are provided in the encoder apparatus for altering the transmitted error bits in such a way that the decoder can search for some test patterns other than all zeros in the shift register.

Figure 4:
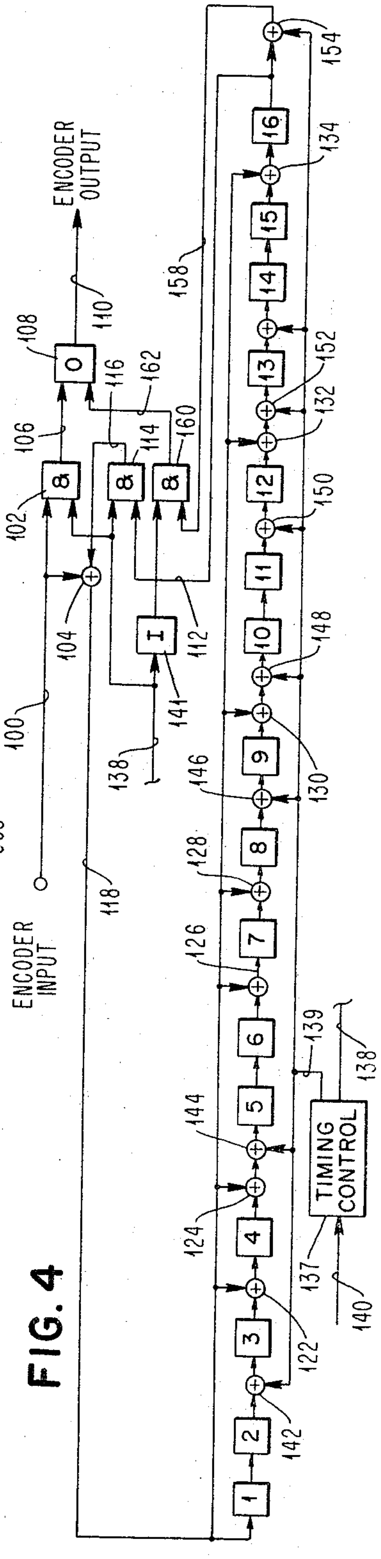
FIGURE 4 is a block schematic diagram of an encoder in which the invention is embodied.

An encoder is shown in FIG. 4 which is provided with apparatus for altering the remainder prior to transmission in such a manner that when the message is decoded the decoder searches for a test pattern of 1 and 0 bits instead of all zeros. Data input line 100 feeds one leg of AND circuit 102 and one input to modulo-2 adder 104. The output 106 of AND circuit 102 drives one leg of OR circuit 108, the output of which goes directly to the encoder output line 110. The output 112 of shift register stage 16 feeds one leg of AND circuit 114, the output 116 of which feeds the other input to modulo-2 adder 104. The output 118 of modulo-2 adder 104 is fed back to shift register stage 1 and is also added modulo-2 to the outputs of shift register stages 3, 4, 6, 7, 9, and 12 and 15, via modulo-2 adders 122, 124, 126, 128, 130, 132, and 134 respectively. The timing control 137 is energized by data synchronizing line 140 and issues control pulses on lines 138 and 139. The outputs of shift register stages 2, 4, 8, 9, 11, 12 and 16 are added modulo-2 to line 139 via modulo-2 adders 142, 144, 146, 148, 150, 152, and 154, respectively. The output 158 of modulo-2 adder 154 drives AND circuit 160, the output 162 of which drives the other leg of OR circuit 108. Control line 138, and line 139 inverted by inverter 141 energize AND circuits 102, 114, and 160 respectively.

In operation, the encoder may operate in a manner identical to that of the prior art described above, with reference to FIG. 1, or the remainder appearing in the shift register after the entire data bit sequence has been processed, may be altered by control line 139. Accordingly, the invention will be described utilizing an altered remainder, although it will be understood that the invention may be practiced by using an encoder which is identical to that used in the prior art, but utilizing a decoder which will frame the data in accordance with the invention, as subsequently described, testing for a test pattern of all zeros.

The sequence of data bits to be encoded arrive in sequence on input line 100. Initially input 138 to AND circuit 102 is energized to permit the data to pass through the AND circuit 102, and OR circuit 108 to the encoder output line 110. The input 100 is also fed to modulo-2 adder 104 where the input is added modulo-2 to the output of the last stage 16 of the shift register via AND circuit 114 which is also energized by line 138. The output 118 of modulo-2 adder 104 is fed back to be modulo-2 added to the shifted outputs of various stages of the shift register in a configuration which is similar to the coding polynomial P(X). The coding polynomial chosen for illustrating the invention is:

$$P(X)=X^{16}+X^{15}+X^{12}+X^{9}+X^{7}+X^{6}+X^{4}+X^{3}+1$$

Timing circuit 138 is driven by an input line 140 which is received in synchronism with the data bit sequence. The timing control 137 counts the data bits, and after a predetermined count, which is equal to the total of the data bits to be encoded, issues a signal on line 138 to de-energize AND circuits 102 and 114. At the same time line 138 inverted permits the remainder, which appears in the shift register, to be shifted out via AND circuit 160 to the encoder output line following the data bits. As the first bit of the remainder is shifted out of stage 16 of the shift register, line 139 energizes the modulo-2 adders 142, 144, 146, 148, 150, and 154 to thereby add a series of bits, F(X), which will be called the "code modulus," to the remainder in the shift register. Line 139 is then de-energized and the shift register continues to shift until all of the remainder has been sent out on the encoded output line 110. This effectively causes the bits $F(x)$ to be added to the remainder contents of the shift register. It should be apparent to those skilled in the art that the remainder may be altered in various ways. For example, a pattern corresponding to the bits $F(x)$ may be preset into the shift register prior to encoding the message.

The code modulus $F(x)$ chosen for the illustrative embodiment of the invention is:

$$F(x)=X^{15}+X^{12}+X^{11}+X^{10}+X^{8}+X^{7}+X^{3}+X^{1}$$

The message bits followed by the altered remainder bits are fed via output 110 to a suitable transmitter for conversion to a signal form suited to the transmission medium.

Figure 5:
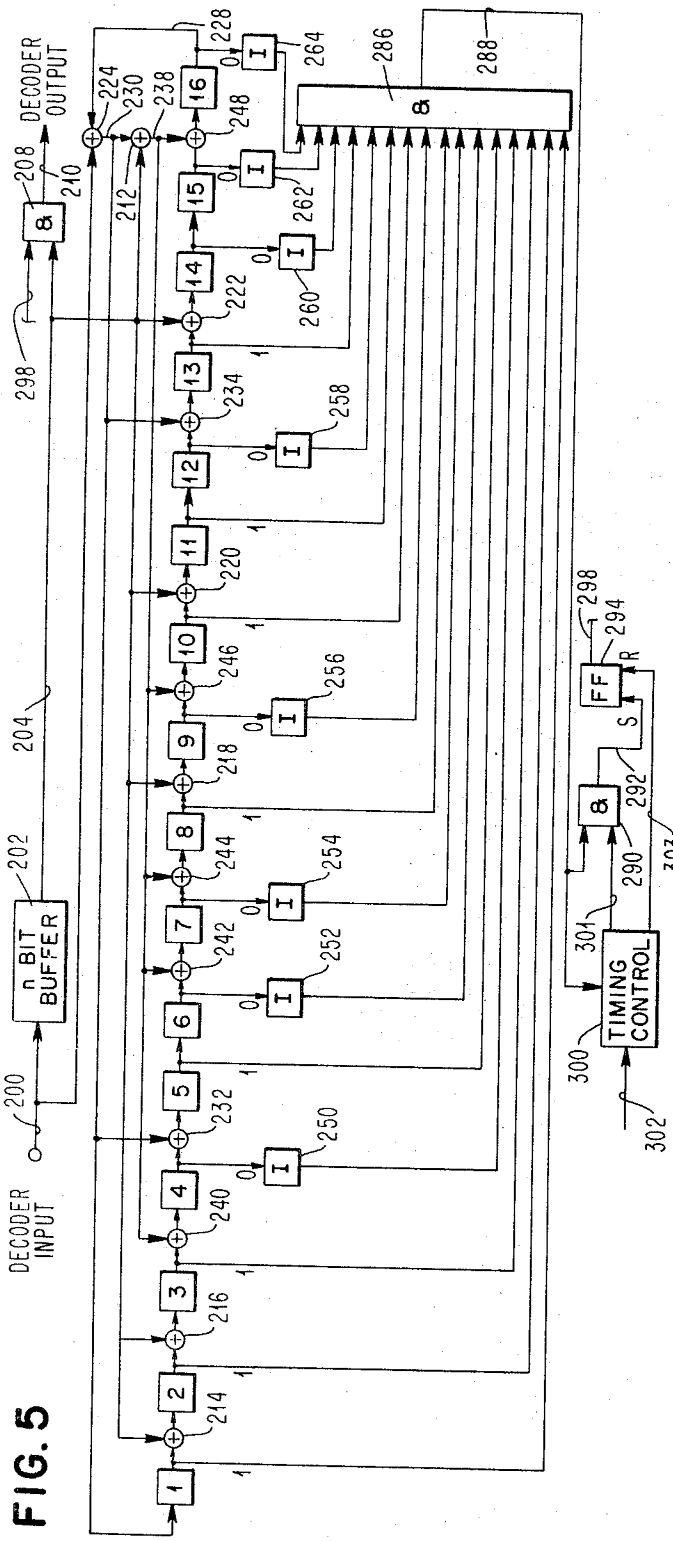
FIGURE 5 is a more detailed block schematic diagram of the decoder shown in FIGURE 3.

A decoder is shown in detail in FIG. 5. The decoder input line 200 is fed to an $n$-bit buffer circuit 202, the output 204 of which feeds an AND circuit 208. Output 210 of the AND circuit provides the decoder output. The $n$-bit buffer output 204 feeds one input of modulo-2 adder 212 and is also fed to modulo-2 adders 214, 216, 218, 220 and 222 respectively. The decoder input 200 feeds modulo-2 adder 224, the other leg of which is fed by the shift register output line 228. The output 230 of modulo-2 adder 224 is fed to shift register stage 1 and is modulo-2 added to the outputs of shift register stages 4 and 12 via modulo-2 adders 232 and 234, respectively. The output 238 of modulo-2 adder 212 is modulo-2 added to the outputs of shift register stages 3, 6, 7, 9, and 15 via modulo-2 adders 240, 242, 244, 246 and 248 respectively.

The outputs of each of the shift register stages 1, 2, 3, 5, 8, 10, 11, and 13 are fed directly to AND 286. The inverted outputs (or complement outputs) of stages 4, 6, 7, 9, 12, 14, 15 and 16 are also fed to AND 286. In the example shown, the outputs of the shift register stages are compared to the pattern 1110100101101000, but it should be understood that any other pattern may be employed, consistent with the transmitted message. Further, appropriate selectively controlled comparing means may be provided for selecting any pattern assigned to one of a plurality of transmitters. The output 288 of AND circuit 286 feeds timing control 300 and AND circuit 290 the output 292 of which feeds the set input of flip-flop 294. The output 298 of the flip-flop feeds a second input to AND circuit 208. Timing control 300 is synchronized with the input by synchronizing line 302 and by line 288. The timing control produces signals 301, 303 which energize AND circuit 290 and the reset input of flip-flop 294 respectively.

The decoder operates in the following manner. The encoded message is received, demodulated and fed to the decoder input line 200. The message comprises a sequence of data bits followed by the error detection (redundancy) bits, the total number of bits being equal to $n$ ($n=230$ in FIGS. 4 and 5 embodiment). The input is passed through an $n$-bit buffer which for example, may be comprised of a series of $n$ shift register stages which may be shifted in synchronism with the incoming data. The decoder input 200 is fed to a modulo-2 adder 224 which adds the input to the shift register output line 228. The output of modulo-2 adder 224 provides part of the feedback connections which establish the $P(x)$ function to the shift register.

The output 204 of the $n$-bit buffer, when energized, represents a 1 bit which appeared on the input line $n$ bit periods earlier in time. Therefore, at any instant of time, when a bit appears at the input 200, a bit which appeared at the input 200 $n$ bit periods earlier will appear at the output of buffer 202. The $n$ bit buffer output 204 supplies directly some of the connections for supplying the function $X^n$. In this embodiment:

$$X^n=X^{-1}+X^{-3}+X^{-6}+X^{-7}+X^{-8}+X^{-9}$$
$$X^{-10}+X^{-13}+X^{-14}+X^{-15}$$

The output of modulo-2 adder 212 provides the common connections to the shift register of the functions P(X) and $X^n$. This configuration is used to avoid the necessity of having a plurality of modulo-2 adders duplicated at the shift register outputs.

When $n$ bits have been received comprising an error free transmitted message, then the shift register should contain G(X), the test pattern 1110100101101000, which is the code modulus F(X) reduced modulo P(X). The outputs of the shift register stages 1–16 are compared with the test pattern by the compare circuit comprised of AND 286 fed by outputs from stages 1, 2, 3, 5, 8, 10, 11 and 13, and inverters 250, 252, 254, 256, 258, 260, 262 and 264. When an equal comparison is obtained, the output of AND circuit 286 permits a control signal to pass through the AND circuit 290 to turn on the flip-flop 294. The output of the flip-flop 294 indicates that a message has been received and permits the $n-r$ data bits stored in $n$-bit buffer 202 to pass through the AND circuit 208 to the decoder output line 210. A timing pulse on line 303 resets flip-flop 294 after $n-r$ bits have been read out.

In summary, with respect to the decoder used to decode the information generated by the prior art encoder of FIG. 1, it is necessary to supply a framing signal at the beginning of the message. Special circuitry must be provided to initiate and supply the framing signal which will reset the shift register and timing circuits. Resetting the register and timing circuits prior to each message is imperative in order to give an accurate division of the message polynomial.

The present invention provides framing of the message data when error detecting redundancy is employed without the necessity of transmitting a series of framing bits preceding the message data. This is accomplished by a decoder which has the capability of continuously examining a series of bits to determine if those bits comprise a message sequence. According to the invention, at any instant of time the decoder shift register will contain the remainder of the division of a sequence of $n$ bits which were just received by the decoder regardless of how many bits were received prior thereto. The invention accomplishes this by continuously subtracting from the contents of the shift register, the effect that a bit which arrived $n$ bit periods earlier had on the contents of the register. That is, whenever a new bit arrives at the input, making a total of $n+1$ bits received, the value of the bit which was received $n$ bit periods previously is subtracted from the register, thus leaving in the register the remainder of the division of the new sequence of $n$ bits, which includes the new bit, just received at the input.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data transmission system of the type in which error detection is accomplished by an encoder shift register which operates upon incoming data in such a way that after all bits of a data polynomial have passed through the encoder shift register the contents of the encoder register contain bits corresponding to the remainder of the division of the data polynomial divided by a coding polynomial, and in which the data polynomial is transmitted followed by the remainder bits, the data bits plus remainder bits totaling $n$ bits, a decoder comprising:
   means for sequentially storing $n$ consecutive bits of a series of received data bits;
   a linear feedback shift register for reducing the data polynomial modulo the coding polynomial;
   means responsive to said storage means for continuously subtracting, modulo the coding polynomial, from the contents of said shift register the value of a data bit which appeared at the input to said linear feedback shift register $n$ bits previously stored in said storage means;
   and means for continuously comparing the contents of said linear feedback shift register with a test pattern and for generating an output signal when the contents of the linear feedback shift register are equal to the test pattern.

2. In a data transmission system in which a message $n$ bits long is transmitted to a receiver, the message comprising a series of bits representing intelligent information followed by a series of error checking bits which are determined by the remainder of the division of said information bits by a series of coding bits, a decoder comprising:
   input means;
   means for applying said input to a delay $n$ bit periods long;
   a shift register;
   means for adding modulo-2 the output of said shift register to said input;
   means for applying the modulo-2 sum of said adding means to selected positions of said shift register in the pattern of the coding polynomial to thereby complement said selected positions;
   means for subtracting, modulo-2, the output of said $n$ delay from the shift register contents at selected positions in a predetermined format to thereby effectively subtract from said shift register the effect that a bit arriving $n$ bit periods in time earlier had on the contents of said register;
   and means for continuously comparing the contents of said register with a pattern which bears a predetermined relationship to the remainder of dividing the information bits by the coding bits.

3. Means for decoding a data message comprising:
   a multistage pulse shifting register;

means for shifting pulses corresponding to the bits of said message successively through successive stages of said shift register;
   means for generating further digits by performing sum-modulo-2 addition of ones of the digits of said message and various shifted positions of said message, so that a bit entering the input of said register has a predetermined value after passing through said register to the output;
   means for storing message bits including means for making said bits available at an output line after $n$ bits have been received at said register;
   and means energizable by a 1 bit at the output of said storage means for subtracting from said register the predetermined value of a bit which entered the register $n$ bit times earlier upon receipt of each successive data bit.

4. In an error detecting encoding apparatus of the type in which error detection bits are generated by means which operate on input data in such a way as to generate a series of error checking bits which represent the remainder of the division of the data bits by a coding polynomial, and in which the error checking bits are transmitted with the transmitted data bits,
   means for complementing certain ones of the error checking bits to thereby produce an altered remainder; and
   means for transmitting said altered remainder bits along with the data bits.

5. Apparatus for framing $n$ bits of a sequence of bits representative of an $n-r$ data bit polynomial $D(x)$ followed by $r$ check bits, the check bits representing the remainder $R(x)$ of the division of $XrD(x)$ by a coding polynomial $P(x)$, comprising:
   an $n$-bit buffer for receiving bits at its input and presenting the bits at an output $n$ bit periods later;
   a linear feedback shift register for determining the remainder of the division of a bit sequence received at its input, modulo $P(x)$;
   means for applying a bit sequence to the input of said buffer and said shift register; and
   means for subtracting modulo-2 the output of the buffer from the shift register contents each time a bit is received at the input to said shift register, at such shift register stages as to thereby maintain in said shift register the congruence of each successive $n$ bits stored in said buffer.

6. The combination according to claim 5 including means for comparing the contents of the shift register with a test pattern to thereby determine whether or not the $n$ bit sequence stored in the buffer corresponds to a valid message.

7. Apparatus for continuously calculating the modulus of $n$ consecutive bits in a train of bits modulo a coding polynomial comprising:
   a decoding shift register;
   means for adding the bits sequentially modulo the coding polynomial to said shift register;
   means for storing bits including means for making said bits sequentially available at an output line $n$ bit periods later;
   and means responsive to the output of said storage means for subtracting modulo the coding polynomial the value of a bit which arrived at said shift register $n$ bit periods earlier.

8. Apparatus for framing a message contained within a sequence of binary digits comprising:
   a decoder which operates upon a train of bits such that after a valid message has passed therethrough said decoder contains a known predetermined pattern of bits; and
   means for continuously up-dating the contents of said decoder so that the effect that a bit received at its input one full message length earlier in time had on its contents is removed from said decoder each time a new bit is received at the input to said decoder.

9. The combination according to claim 8 including comparing means for comparing the contents of said decoder with the known pattern and for generating a framing signal when the decoder contains the pattern.

10. Apparatus for encoding a sequence of data bits comprising:

an encoder linear feedback shift register having appropriate feedback connections to reduce the data bit polynomial modulo a given coding polynomial P(X) to thereby generate a sequence of remainder bits R(X) and means for adding modulo-2 a given code modulus F(X) to the remainder R(X) comprising a predetermined sequence of bits;

the transmitted sequence of bits, when reduced modulo P(X) in a decoder, yielding a test pattern for message framing.

11. A data transmission system comprising:

an encoder linear feedback shift register for encoding a sequence of data bits, said shift register having appropriate feedback connections to reduce the data bit polynomial modulo a given coding polynomial P(X) to thereby generate a sequence of *r* remainder bits R(X);

means for adding modulo-2 a given code modulus F(X) to the remainder R(X) to thereby generate an altered remainder;

a decoder linear feedback shift register having appropriate feedback connections to reduce a polynomial introduced at its input modulo the coding polynomial P(X);

an *n*-bit buffer having an output at which each bit introduced at its input appears after a delay of *n*-bit periods;

means responsive to the output of said buffer for subtracting from the decoder shift register contents, the effect that a bit arriving *n*-bit periods earlier in time had on the contents of said register;

comparing means for comparing respective stages of said decoder linear feedback shift register with a test pattern G(X), which is the code modulus F(X) reduced modulo P(X), and for issuing an output when an equal comparison occurs; and means for transmitting said data bits followed by said altered remainder bits totaling *n* bits to the input of said decoder shift register and the input of said *n* bit buffer.

12. The combination according to claim 11 including means responsive to said comparing means output for permitting *n*–*r* data bits stored in said *n* bit buffer to be read out of said decoder.

References Cited

UNITED STATES PATENTS

| | | | |
|---|---|---|---|
| 3,093,707 | 6/1963 | Nicholson et al. | 340—146.1 |
| 3,114,130 | 12/1963 | Abramson | 340—146.1 |
| 3,123,803 | 3/1964 | De Lisle et al. | 340—146.1 |
| 3,159,810 | 12/1964 | Fire | 340—146.1 |
| 3,163,848 | 12/1964 | Abramson | 340—146.1 |
| 3,164,804 | 1/1965 | Burton et al. | 340—146.1 |

MALCOLM A. MORRISON, *Primary Examiner.*

ROBERT C. BAILEY, *Examiner.*

M. P. ALLEN, M. P. HARTMAN, *Assistant Examiners.*

UNITED STATES PATENT OFFICE

CERTIFICATE OF CORRECTION

Patent No. 3,336,467 August 15, 1967

Alexander H. Frey, Jr.

It is hereby certified that error appears in the above numbered patent requiring correction and that the said Letters Patent should read as corrected below.

Column 11, lines 15 and 16, strike out "to the remainder R(X) comprising a predetermined sequence of bits" and insert instead -- comprising a predetermined sequence of bits to the remainder R(X) --.

Signed and sealed this 22nd day of October 1968.

(SEAL)
Attest:

Edward M. Fletcher, Jr.
Attesting Officer

EDWARD J. BRENNER
Commissioner of Patents